(12) United States Patent
Gruenstein et al.

(10) Patent No.: US 10,140,978 B2
(45) Date of Patent: Nov. 27, 2018

(54) SELECTING ALTERNATES IN SPEECH RECOGNITION

(71) Applicant: Google LLC, Mountain View, CA (US)

(72) Inventors: Alexander H. Gruenstein, Mountain View, CA (US); Dave Harwath, Naperville, IL (US); Ian C. McGraw, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/703,033

(22) Filed: Sep. 13, 2017

(65) Prior Publication Data

US 2018/0012592 A1 Jan. 11, 2018

Related U.S. Application Data

(63) Continuation of application No. 14/532,208, filed on Nov. 4, 2014, now Pat. No. 9,779,724.

(Continued)

(51) Int. Cl.
*G10L 15/00* (2013.01)
*G10L 15/08* (2006.01)
(Continued)

(52) U.S. Cl.
CPC ........ *G10L 15/08* (2013.01); *G10L 2015/221* (2013.01)

(58) Field of Classification Search
CPC ......... G10L 15/22; G10L 15/08; G10L 15/01; G10L 15/32; G10L 15/18; G10L 15/063;
(Continued)

(56) References Cited

U.S. PATENT DOCUMENTS 5,829,000 A 10/1998 Huang
5,899,976 A 5/1999 Rozak
(Continued)

FOREIGN PATENT DOCUMENTS

WO 2015026366 2/2015

OTHER PUBLICATIONS

"Statistical Classification" Wikipedia, the free encyclopedia, downloaded from the internet on Oct. 30, 2014 at: http://en.wikipedia.org/wiki/Statistical_classification, 7 pages.

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on a computer storage medium, for selecting alternates in speech recognition. In some implementations, data is received that indicates multiple speech recognition hypotheses for an utterance. Based on the multiple speech recognition hypotheses, multiple alternates for a particular portion of a transcription of the utterance are identified. For each of the identified alternates, one or more features scores are determined, the features scores are input to a trained classifier, and an output is received from the classifier. A subset of the identified alternates is selected, based on the classifier outputs, to provide for display. Data indicating the selected subset of the alternates is provided for display.

20 Claims, 7 Drawing Sheets

Related U.S. Application Data

(60) Provisional application No. 61/899,829, filed on Nov. 4, 2013, provisional application No. 61/899,582, filed on Nov. 4, 2013.

(51) Int. Cl.
*G10L 15/04* (2013.01)
*G10L 15/22* (2006.01)

(58) Field of Classification Search
CPC ... G10L 17/22; G10L 2015/088; G10L 25/48; G10L 15/05; G10L 15/083; G10L 15/06; G10L 15/10; G10L 15/20; G10L 2015/085; G10L 2015/221
USPC .............................. 704/2, 240, 254
See application file for complete search history.

(56) References Cited

U.S. PATENT DOCUMENTS

| | | | |
|---|---|---|---|
| 6,260,013 | B1 | 7/2001 | Sejnoha |
| 6,260,015 | B1 | 7/2001 | Wang |
| 6,910,012 | B2 | 6/2005 | Hartley |
| 7,747,437 | B2 | 6/2010 | Verhasselt |
| 7,856,351 | B2 | 12/2010 | Yaman |
| 7,941,316 | B2 | 5/2011 | Mahajan |
| 8,224,656 | B2 | 7/2012 | Scholz |
| 8,494,852 | B2 | 7/2013 | LeBeau et al. |
| 8,521,526 | B1 | 8/2013 | Lloyd et al. |
| 2009/0240488 | A1* | 9/2009 | White .................. G06F 3/0236 704/9 |
| 2010/0179803 | A1 | 7/2010 | Sawaf |

OTHER PUBLICATIONS

Cockburn, A. and Siresena, A., "Evaluating mobile text entry with the Fastap keypad," in British Computer Society Conference on Human Computer Interaction, England, 2003, 4 pages.

Feng, J. and Bangalore, S., "Effects of word confusion networks on voice search," in Proceedings of the 12th Conference of the European Chapter of the Association for Computation Linguistics, 2009, 8 pages.

Hakkani-Tür, D., Bechet, F., Riccardi, G., and Tur, G., "Beyond ASR 1-best: using word confusion networks in spoken language understanding," in Computer Speech and Language 20(4), 20 pages.

Jaitly, N., Nguyen, P., Senior, A., and Vanhoucke, V., "Application of pretrained deep neural networks to large vocabulary speech recognition," in Proceedings of Interspeech, Portland, Oregon, 2012, 4 pages.

Larson, K. and Mowatt, D., "Speech error correction: the story of the alternates list," in International Journal of Speech Technology vol. 6, No. 2, 2003, 12 pages.

Ogata, J. and Goto, M., "Speech repair: quick error correction just by using selection operation for speech input interfaces," in Proceedings of Interspeech, Lisbon, Portugal, 2005, 4 pages.

Vertanen, K. and Kristensson, P.O., "Parakeet: a continuous speech recognition system for mobile touch-screen devices," in IUI '09: Proceedings of the 14th International Conference on Intelligent User Interfaces. ACM, 2009, 10 pages.

Vertanen, K., "Efficient correction interfaces for speech recognition," PhD thesis, University of Cambridge, 2009, 283 pages.

\* cited by examiner

*300*

*302a* → 0_mary_.5  .5_had_.7  .7_a_.8  .8_little_1.2  1.2_yam_1.4

*302b* → 0_gary_.5  .5_had_.7  .7_a_.8  .8_little_1.2  1.2_lamb_1.4

*302c* → 0_mary_.5  .5_had_.7  .7_a_.8  .8_little_1.2  1.2_lambourghini_1.8

*302d* → 0_gary_.5  .5_had_.7  .7_a_.8  .8_little_1.2  1.2_lambourghini_1.8

SELECTING ALTERNATES IN SPEECH RECOGNITION

CROSS-REFERENCE TO RELATED APPLICATIONS

This application is a continuation of U.S. application Ser. No. 14/532,208, filed Nov. 4, 2014, now pending, which claims the benefit of U.S. Provisional Patent Application Ser. No. 61/899,582, filed Nov. 4, 2013 and U.S. Provisional Patent Application Ser. No. 61/899,829, filed Nov. 4, 2013. The contents of each of the prior applications are hereby incorporated herein by reference.

TECHNICAL FIELD

This specification generally relates to speech recognition systems.

BACKGROUND

Speech recognition is an increasingly important input modality, especially for mobile computing. Because errors are sometimes unavoidable in real-world applications, efficient correction methods can greatly enhance the user experience.

SUMMARY

A classifier for use in speech recognition can be trained to indicate which alternates should be provided to a user for correcting errors in a transcription. In some implementations, using a classifier as described below, the average number of alternates shown to the user can be reduced without significantly reducing the number of errors that a user can correct. The rank order in which alternates are displayed to the user can be determined based on scores from the classifier.

The techniques discussed below include a re-ranking and classification strategy for choosing word alternates to display to the user. In some implementations, word alternates can be shown in the framework of a tap-to-correct interface. By employing a machine learning framework, such as a logistic regression model, to estimate the probability that an alternate will offer a useful correction to the user, the average length of alternates lists can be reduced, in some instances, with no reduction in the number of words they are able to correct.

In one general aspect, a method includes: receiving data indicating multiple speech recognition hypotheses for an utterance; identifying, based on the multiple speech recognition hypotheses, multiple alternates for a particular portion of a transcription of the utterance; for each of the identified alternates: (i) determining one or more feature scores for the alternate; (ii) inputting the one or more feature scores to a trained classifier; and (iii) receiving an output from the classifier; selecting a subset of the identified alternates to provide for display based on the classifier outputs; and providing, for display, data indicating the selected subset of the alternates.

Other implementations of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, receiving data indicating multiple speech recognition hypotheses for the utterance includes receiving data indicating a speech recognition lattice. Selecting the subset of the identified alternates to provide for display based on the classifier outputs includes selecting a subset of the identified alternates that each have a corresponding classifier output that satisfies one or more thresholds. The particular portion of the transcription of the utterance corresponds to a particular word; and identifying the multiple alternates for the particular portion of the transcription of the utterance includes: determining a time that the particular word begins or ends with respect to the utterance; accessing data indicating times that words in the multiple speech recognition hypotheses begin or end with respect to the utterance; and identifying the words in the multiple speech recognition hypotheses based on a measure indicative of a distance between (i) the time that the particular word begins or ends with respect to the utterance and (ii) the times that the words in the multiple speech recognition hypotheses begin or end with respect to the utterance.

Implementations may include one or more of the following features. For example, the classifier is a maximum entropy classifier; and each of the alternates is a word or a phrase that is different from the particular portion of the transcription of the utterance. The trained classifier is trained to produce, based on input feature scores for an alternate, a score that indicates a likelihood that the alternate will be useful to a user. Identifying the alternates for the particular portion of the transcription of the utterance includes determining the alternates based on a speech recognition lattice for the utterance. The multiple speech recognition hypotheses are ranked in a ranking; and determining the one or more feature scores for the alternate includes determining, for the alternate, a feature score indicating whether the speech recognition hypothesis at a specific position in the ranking includes the alternate. The multiple speech recognition hypotheses are ranked in a ranking; and determining the one or more feature scores for the alternate includes determining, for the alternate, a number of unique identified alternates for the particular portion that occur in speech recognition hypotheses ranked higher than the highest-ranked speech recognition hypothesis that includes the alternate. The multiple speech recognition hypotheses are ranked in a ranking; and determining the one or more feature scores for the alternate includes determining, for the alternate, a ranking position of the highest-ranking speech recognition hypothesis that includes the alternate.

Implementations may include one or more of the following features. For example, determining the one or more feature scores for the alternate includes determining a feature score for the alternate based on: a length the particular portion of the transcription of the utterance; a length of the alternate; or a relative measure of (i) the length of the particular portion of the transcription of the utterance and (ii) the length of the alternate. Determining the one or more feature scores for the alternate includes determining a feature score for the alternate based on: a posterior probability for the alternate; a posterior probability for the particular portion of the transcription of the utterance; a language model score for the alternate; or a language model score for the particular portion of the transcription of the utterance. Determining the one or more feature scores for the alternate includes determining a feature score for the alternate based on: a text edit distance between the alternate and the particular portion of the transcription of the utterance; or a phone edit distance between alternate and the particular portion of the transcription of the utterance. The method may include: accessing data indicating transcriptions for utterances and alternates for the candidate transcriptions; determining a set of one or more feature scores for each of the alternates; and training the classifier using the sets of feature scores and labels that indicate a level of usefulness of the alternates with respect to the transcriptions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figures 1A, 1B:
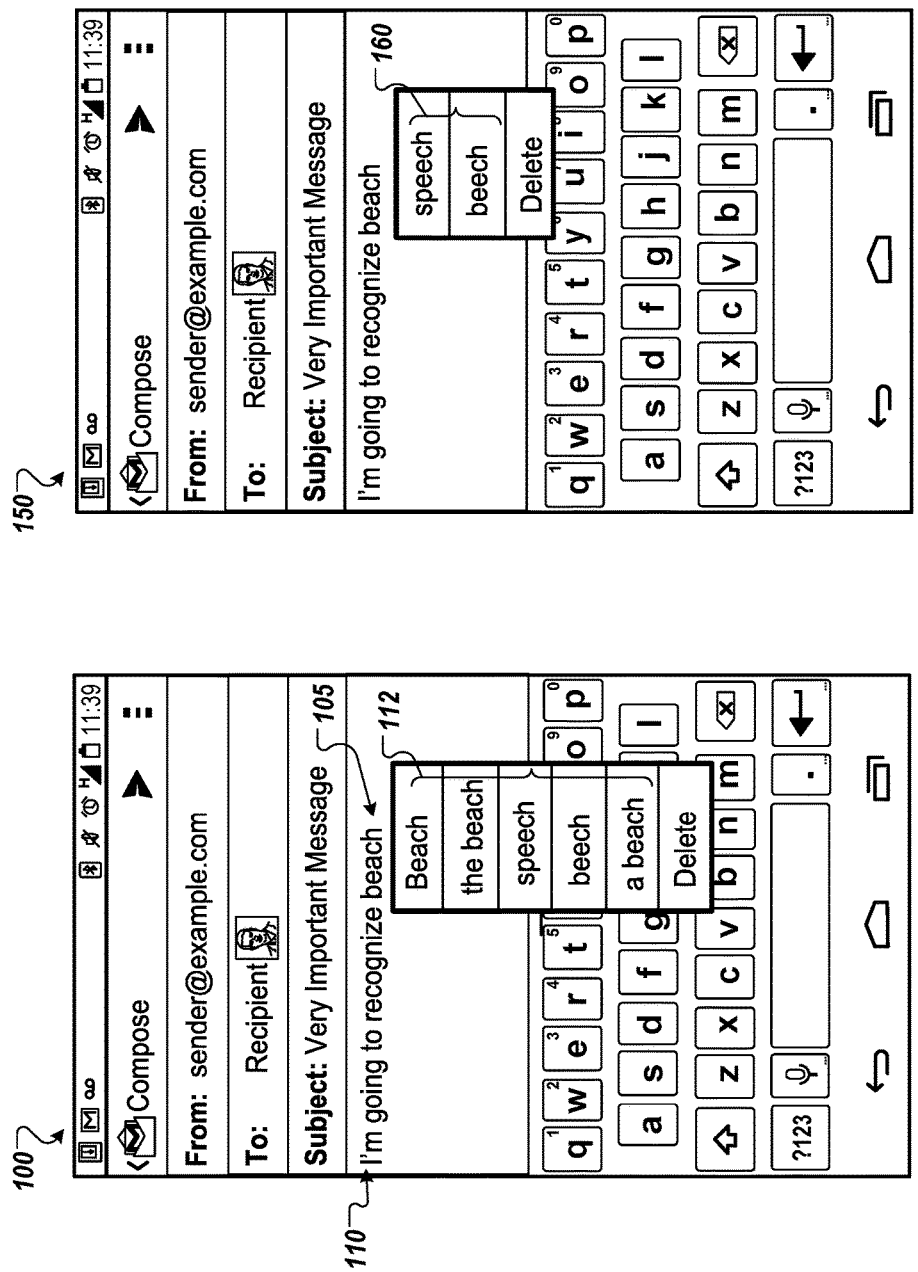
FIGS. 1A & 1B are examples of user interfaces for speech recognition.

Recently, automatic speech recognition has seen significant levels of adoption, especially by users of mobile devices. Typically, it is much faster to dictate than to enter text in a virtual keyboard, however, the need to make corrections to dictated text can reduce the overall speed significantly. While better recognition accuracy has improved usability, absence of all errors is impractical or impossible in many systems, which makes efficient error correction very valuable.

Many categories of error correction strategies can be used for speech recognition. Re-entry methods require the user to repeat some or all of the misrecognized utterance, or to fall back to keyboard entry. Other approaches take advantage of competing recognition hypotheses in the form of an N-best list, word lattice, or word confusion network (WCN). Because WCNs offer a highly compressed and often more interpretable view of a word lattice, they are a popular representation for spoken language understanding as well as speech recognition correction. Touch-screen devices may be well-suited for WCNs since the user need only tap the correct words on the screen to correct a spoken input. A more lightweight representation similar to a WCN is the alternates list, in which a user can first indicate the misrecognized words in a hypothesis and then be prompted to select from a list of candidates to replace the misrecognized text. One difference between an alternates list and a typical word confusion network that alternates lists may allow a user to replace words at the short phrase level as well as the word level. In some implementations, candidate alternates are identified using an N-best list of recognition hypotheses with timing information. In some instances, when an alternates list and re-dictation are available options for correcting a transcription, users will opt to use the alternates lists first, falling back on re-dictation when the correct word is not in the alternates list.

Because they are well suited for mobile touch-screen devices and generally satisfying to users, alternates lists are a promising method of speech correction. It is important, however, to show the correct word or phrase in the list, while minimizing the number of incorrect corrections displayed to the user. The techniques discussed below include automatic re-ranking and selection of hypotheses with which to populate an alternates list. The techniques also discuss a discriminative classifier, which may be applied directly to the alternates lists generated for individual words and phrases.

In some implementations, when offering word or phrase alternates to a user, it may be desirable for alternates to meet certain criteria. First, the alternates should enable the user to correct as many word errors as possible. Second, the alternates lists should be concise. Screen space is limited on mobile devices. In addition, forcing a user to read through long alternates lists is a burden which should be avoided. In practice, there is a tradeoff between these goals since increasing the size of the alternates lists tends to increase the odds that the proper correction is contained within the list.

Given an erroneous speech recognition hypothesis and a set of alternates, the task of predicting which of those alternates will be useful to the user and which will not can be viewed as a binary classification problem. An alternate may be defined to be useful if the alternate has the potential to correct word errors in a recognition hypothesis. At run-time, the system estimates the probability that each alternate would be used to correct one or more errors, for example, single word errors or errors in short phrases. Because of its simplicity and ease of training, logistic regression can be used to predict this probability. Logistic regression also supports highly flexible feature spaces, and can easily handle combinations of binary and continuous features. In some implementations, a maximum entropy classifier is used. Other machine learning and estimation techniques may also be used.

FIG. 1A is an example of a user interface 100 for speech recognition. Sometimes automatic speech recognizers make errors when transcribing speech, so users often need a way to make corrections. One way to facilitate corrections is to provide alternate words when a user selects a word, for example, by tapping or clicking on a word, selecting a word with a spoken command, or using another mechanism. In the example of FIG. 1, a user can tap on a word 105 (e.g., "beach") in recognized text 110 to cause a list 112 of alternate words to be displayed. The user can select one of the alternate words to replace the incorrect word 105.

FIG. 1B is another example of a user interface 150 for speech recognition. In some implementations, it can be advantageous to provide users with short lists of alternate words. For example, in some implementations, only words that have a high probability of being correct should be provided as alternate words. In the example of FIG. 1B, a list 160 of alternate words for the word "beach" is shown. The list 160 has fewer alternate words than the list 112, making it easier for the user to identify the correct alternate, which in this instance is the word "speech." The techniques described below may be used to shorten lists of alternate words without significantly reducing the number of errors that can be corrected by the provided alternates.

Figure 2:
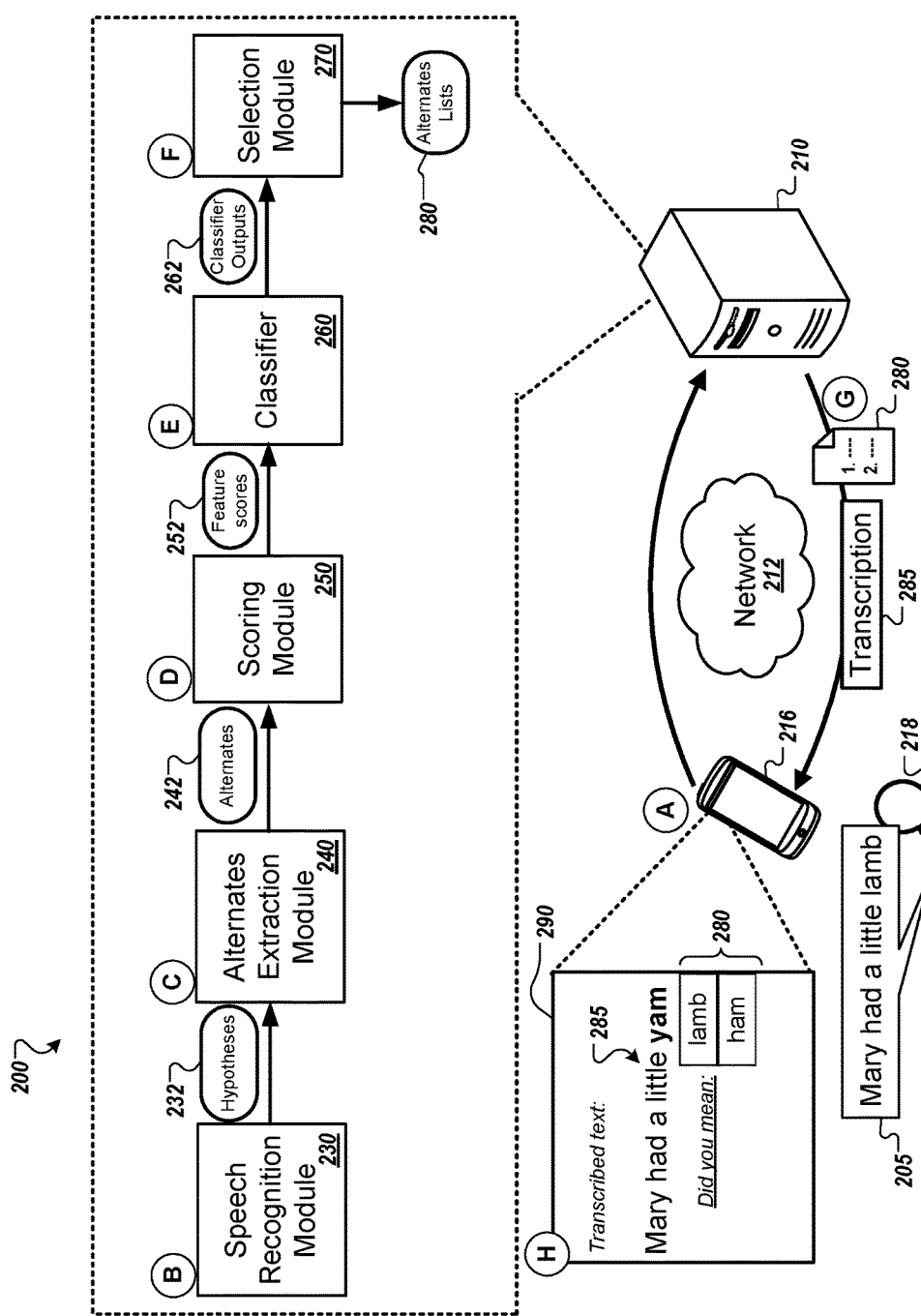
FIG. 2 is a diagram that illustrates an example of a system for selecting alternates in speech recognition.

FIG. 2 is a diagram that illustrates an example of a system 200 for selecting alternates in speech recognition. The system 200 includes a computing system 210, a network 212, data storage 214, and a client device 216. The figure shows stages (A) to (H) which illustrate a flow of data.

In the example of FIG. 2, the computing system 210 receives speech data from the client device 216, obtains a set of speech recognition hypotheses (e.g., candidate transcriptions), and provides information about particular words in the hypotheses to a trained classifier. The computing system 210 uses output from the classifier to select a subset of the hypotheses to provide to the client device 216 as alternates for display to a user 218 of the client device 216.

In the system 200, the functions performed by the computing system 210 can be performed by individual computer systems or can be distributed across multiple computer systems. The network 212 can be wired, wireless, or a combination of both, and the network 212 can include the Internet. The client device 216 can be, for example, a desktop computer, laptop computer, a tablet computer, a wearable computer, a cellular phone, a smart phone, a music player, an e-book reader, a navigation system, or any other appropriate device.

During stage (A), the user 218 speaks, and the client device 216 detects the utterance 205. In the example, the user 218 says the phrase, "Mary had a little lamb," and the audio is recorded at the client device 216. The client device 216 sends audio data 220 for the utterance to the computing system 210, for example, over the network 212. The audio data 220 indicates characteristics of the utterance 205 and may include, for example, an audio waveform, speech features extracted from the utterance 205, or other representations of the utterance 205.

During stage (B), the computing system 210 obtains hypotheses 232 for the utterance 205. The hypotheses 232 are each different potential transcriptions for the utterance 205. In some implementations, the computing system 210 includes a speech recognition module 230 that generates hypotheses based on the audio data 220. In other implementations, the computing system 210 receives the hypotheses from a speech recognition engine of another system. The hypotheses 232 can include a ranking of the hypotheses 232, for example, an order of the hypotheses 232 from most likely to be correct to least likely to be correct, as estimated by a speech recognizer. The hypotheses 232 can be an N-best list of hypotheses, where N is a predetermined integer, for example, 10, 20, 50, etc. Other information, such as confidence scores, acoustic model scores, and/or language model scores, may also be obtained. In some implementations, the hypotheses 232 can be received as a speech recognition lattice.

The highest-ranking hypothesis is typically considered the transcription most likely to be a correct transcription of the utterance 205. Accordingly, the highest-ranking hypothesis may be selected as an initial transcription, and may be shown to the user or otherwise used as an initial estimate of the content of the utterance 205.

During stage (C), an alternates extraction module 240 of the computing system 210 determines a list of alternates for each of various words and phrases in the initial transcription of the utterance 205. The hypotheses 232 other than the highest-ranking hypothesis are used to identify alternates, as discussed below. Alternates may be potential substitutes for at least a portion of the initial transcription. In some implementations, each alternate may be a word, or may be a phrase including multiple words. Sets of alternates can be identified for different portions of an utterance, e.g., a first set of alternates for a first word in the utterance 205, a second set of alternates for a second word in the utterance 205, and so on. Examples of hypotheses and alternates are shown in FIGS. 3 and 4.

Figures 3, 4:
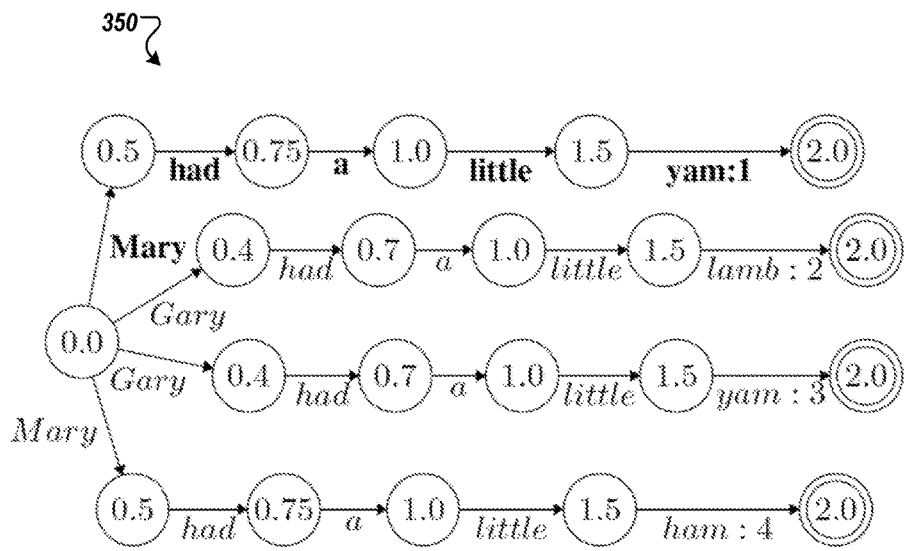
FIG. 3 is a diagram that illustrates examples of hypotheses and extracted alternates.
FIG. 4 is a diagram that illustrates an example of a speech recognition lattice.

FIG. 3 is a diagram that illustrates an example of hypotheses and extracted alternates 300. Four different hypotheses 302a-302d for the utterance 205 are shown. Each of the words is labeled with a start time and end time that indicate which portions of the utterance 205 the respective words correspond to. The times may be determined by the speech recognizer based on the times that various phonemes or other acoustic units occur in the audio data 220. For example, the start times and end times may be designated by the speech recognition module 230 as an estimate of the time that the words occur in the utterance 205. In the hypothesis 302a, for example, the word "Mary" is estimated to begin at zero seconds and end at 0.5 seconds, the word "had" is estimated to occur in the time from 0.5 seconds to 0.7 seconds, and so on. The timing information permits the different hypotheses 302a-302d to be aligned, so that words that represent transcriptions of the same portion of the audio data 220 may be identified.

The times that words in the hypotheses 302a-302d begin and end in the hypotheses 302a-302d can be used as boundaries to define segments of the utterance 205. A set of alternates can be selected for each particular portion of the utterance 205, by finding words or phrases that start and/or end at approximately the same time as that particular portion. All of the words or phrases that correspond to the same portion of the utterance may be considered alternates for each other.

The hypothesis 302a is the highest-ranked hypothesis, and thus is used as the initial transcription for the utterance 205. The computing system 210 identifies alternates for different words in the utterance 302 from the other hypotheses 302b-302d. For example, the initial transcription for the portion of the utterance from zero to 0.5 seconds is "Mary," and "Gary" is selected as an alternate, e.g., as a potential substitute. As another example, the fifth word in the initial transcription is "yam." The alternates for the fifth word in the utterance 205 are "lamb," and "lambourghini." The computing system 210 determines that these are alternates for the word "yam" because the speech recognition module 230 indicates that the words each begin at the same time as the word "yam," e.g., 1.2 seconds into the utterance 205.

In some implementations, alternates can be determined for phrases that include multiple words. A phrase may be required to meet certain criteria for a set of alternates to be determined. For example, a phrase in the initial transcription may be required to have a length that is less than a maximum threshold.

In some implementations, alternates are extracted from a particular set of hypotheses, for example, an "N-best list" that includes the N hypotheses that the speech recognizer considers most likely to be correct, where N is an integer. The value of N may be predetermined, for example, 10, 20, 50, etc.

For a formal description of the task of finding alternates, let w be a word in the recognition hypothesis aligned to the audio interval $[t_0^w, t_1^w]$. To find alternates for w, a computing system scans the N-best list entries for words approximately aligned to the same audio interval. The amount of overlap between w and some other word v aligned to the audio interval $[t_0^v, t_1^v]$ can be quantified as shown in Equation 1:

$$\frac{\min(t_1^v, t_1^w) - \max(t_0^v, t_0^w)}{t_1^w - t_0^w}$$

When this overlap exceeds a threshold (such as 0.1, 0.2, 0.3, etc.), v is considered a candidate alternate for w. Note that multiple consecutive words in a single N-best entry may overlap with w, in which case the phrase formed by those words is considered a single candidate alternate for w. Additionally, this technique can be generalized to handle consecutive words in the recognition hypothesis by concatenating their alignment intervals. The intervals may be concatenated for every sequence of words in the hypothesis whose total length does not exceed a predetermined threshold (e.g., 10 characters, 15 characters, 20 characters, etc.), in order to generate alternates for short phrases.

When a speech recognition lattice is used, each hypothesis may be a different path for traversing the lattice. FIG. 4 is a diagram that illustrates an example of a speech recognition lattice 400. In particular, FIG. 4 illustrates an N-best lattice indicating the paths through the lattice estimated as most likely to be correct. The N-best lattice includes timing information. Timing information is tracked by the state labels, and the N-best position is reflected as a cost attached to the final word in each path. The 1-best path (which would be displayed to the user as the recognition hypothesis) is shown in bold.

Referring again to FIG. 2, during stage (D), the computing system 210 uses a scoring module 250 to determine feature scores 252 for the identified alternates. As discussed above, a set of alternates may be determined for each word and/or phrase in the initial transcription of the utterance 205. The scoring module 250 may determine a set of feature scores for each alternate in each of these different sets of alternates. In some implementations, each feature score is a binary value, e.g., a value of either "1" or "0" to indicate whether a particular characteristic or contextual factor is present or absent. In other implementations, features scores have other values. Examples of features that can be used include N-best list position features, posterior features, and text-distance-based features. Implementations may determine one or more of the features discussed below.

N-best list position features may reflect how far down in the N-best list the alternate appears. Examples of features include a depth of an n-best list for the utterance where the alternate first occurs, and rank positions at which the alternate occurs in the n-best list. The feature scores may indicate information about words at predetermined positions in the N-best list of hypotheses.

For example, a feature score may take the value of the index of the N-best entry in which the alternate is first found. The deeper we must look in the N-best list to find the alternate, the larger this feature becomes. Multiple binary features may be included to reflect when an alternate appears in specific N-best entries. For example, when an alternate appears in the 2nd best hypothesis, the corresponding binary feature for the 2nd position takes on a "1" value. If this same alternate does not appear in the 3rd best hypothesis, then the feature corresponding to the 3rd best path takes on a "0" value. These binary features for the 2nd, 3rd, 4th, and 5th best paths can be included, as well as an extra feature representing all paths beyond the 5th best. Because an alternate may appear in multiple N-best paths, several of these binary features may be active at the same time.

Another N-best position-based feature that may be used is the N-best rank. The N-best rank of an alternate reflects the number of other unique alternates appearing before it in the N-best list.

Given the N-best list shown in FIG. 4, suppose it is desired to generate alternates for the word "yam." The N-best depth feature of the alternate "lamb" would be "2," since the alternate first appears in hypothesis ranked 2nd, and the N-best rank feature of the alternate would be "1" since no other alternates appear before it in the N-best list. The N-best depth feature of the alternate "ham" would be "4" since it first appears in the 4th best hypothesis, but the N-best rank feature of "ham" would be "2" since the alternate "lamb" appears before it. The occurrence of "yam" from the 3rd best hypothesis is not considered to be an alternate, because it is the same in the 1-best hypothesis we are attempting to replace.

Posterior features may indicate probabilities determined during speech recognition. Many speech recognition word confidence classifiers rely on posterior probabilities. Given a word or phrase v in the 1-best hypothesis and a candidate alternate, w, the posterior probabilities for v and w can be estimated using the likelihoods of the N-best list entries. Assuming that the likelihoods of the entries in the N-best list have been normalized to sum to 1, the scoring module 250 can accumulate the likelihoods of all the N-best paths which contain v at the same, time-aligned position as v in the 1-best hypothesis. This computation may be repeated for all paths containing w at the same time-aligned position to estimate a posterior probability of the alternate w. Both the posterior for w as well as the posterior for v are included as feature scores for the alternate w. In some implementations, in addition to or instead of scores for posterior features, one or more feature scores may indicate a language model scores for a word in the alternate, or for a word in the corresponding string that the alternate would replace.

Distance-based features can also be used. Features relating to the text of the alternate w and the text of the 1-best word or phrase v can also be computed. The absolute string lengths of w and v are included as features for the alternate w, but several features representing the string distance between w and v can also be computed. One feature can be a text edit distance between an alternate and the corresponding string in the initial transcription. For example, the feature may indicate a simple Levinshtein distance with equal insertion, substitution, and deletion costs.

Another feature can indicate a phone edit distance between an alternate and the corresponding string in the initial transcription. The phone edit distance can be an edit distance between phonetic representation of the alternate and a phonetic representation of the corresponding string that the alternate would replace. The edit distance between the phones may indicate, for example, how similar or different the sounds of the alternate and the corresponding string are.

Other features indicate the relative lengths of w and v. When an alternate w is longer than the string v it replaces, the relative overshoot is described by Equation 2, below:

$$\text{overshoot} = \frac{len(w) - len(v)}{len(v)}$$

In Equation 2, the operator len(•) represents string length, and the overshoot is taken to be 0 when len(w)<len(v).

When len(w)<len(v), a relative undershoot value can be used, as shown in Equation 3, below:

$$\text{undershoot} = \frac{len(v) - len(w)}{len(v)}$$

In the case that len(w)>len(v), the undershoot is considered to be 0.

Features can also indicate information about the alternate itself, for example, a length of the alternate, e.g., in characters, phonemes, or words. Other features may indicate data about the alternate from a lexicon.

Features may indicate information about the corresponding word(s) in the initial transcription that an alternate may potentially replace. For example, a feature may indicate a length of a string in the candidate transcription that may be replaced by the alternate.

As discussed above, some features may indicate relative measure of an alternate and its corresponding portion of the initial transcription. For example, a feature may indicate a relative length of the alternate to the portion of the candidate transcription to be replaced.

Feature scores can be determined based on data from other sources also. For example, the initial transcription or a portion thereof can be provided to a service that provides autocomplete suggestions. The autocomplete suggestions may then be analyzed, and features may indicate whether the alternate is among the suggestions received. Feature scores may indicate at what rank positions the alternate occurs in a ranked list of suggestions and other aspects of the suggestion set.

During stage (E), the computing system 210 inputs the feature scores to a trained classifier 260, and receives outputs 262 from the classifier 260. Examples of classifiers that may be used to evaluate alternates include maximum entropy or logistic regression classifiers, neural networks, and support vector machines. The classifier 260 may be one that has been trained to produce a score other output that indicates a likelihood that an alternate will be useful to a user. For example, the classifier may be configured to determine, in response to a set of feature scores for an alternate, an output indicative of how likely the word is to be selected by a user to replace the corresponding string in the initial transcription. Thus, the outputs of the classifier for the various alternates, the computing system 210 may estimate which of the identified alternates is most useful to show to users as alternates for the initial transcription of the utterance.

Each individual set of feature scores, corresponding to a single alternate for a specific position of the utterance 205, is input separately to the classifier 260 and has a separate output from the classifier 260. For example, with respect to FIG. 4, the word "yam" is shown having alternates of "lamb" and "ham." The feature scores for the alternate "lamb" are provided to the classifier 260, which produces an output estimating the usefulness of "lamb" as an alternate for "yam" in the present transcription. The features scores for the alternate "ham" are then provided to the classifier 260, which produces an output estimating the usefulness of "ham" as an alternate for "yam." A similar process is performed for the rest of the alternates for "yam," as well as each of the alternates for each of the other words and/or phrases in the initial transcription.

During stage (F), a selection module 270 of the computing system 210 selects from among the alternates to determine alternates lists 280 that may be provided for display. The selection module 270 may select multiple alternates lists, with one list for each word and/or phrase of the initial transcription. An alternates list selected for a particular portion of the transcription may include some or all of the alternates identified for that particular portion from the hypotheses 232. Typically, an alternates list includes a proper subset of the identified alternates.

To select a set of alternates for a particular word or phrase, the selection module may select the alternates that have classifier scores that satisfy one or more thresholds. For example, if the score is above the threshold, the corresponding alternate can be designated for presentation to the user. If the score for an alternate is below the threshold, the proposed alternate is discarded and is not shown to the user. In some implementations, only alternates that have classifier scores that satisfy the threshold will be shown to the user when the user selects a word to correct. As a result, the number of alternates selected may vary based on the classifier outputs. In addition, alternates can be presented in an order determined by their classifier scores, for example, with the alternates that the classifier indicates.

In some implementations, the selection module 270 may limit the alternates list to a predetermined number of items, e.g., the M alternates predicted to be most useful, when M is an integer, such as 1, 2, 3, 5, 10, etc. For example, the selection module 270 may rank the alternates for a particular word or phrase according to the classifier outputs for the alternates, and select a highest-ranking subset, such as the top M alternates for the particular word or phrase.

During stage (G), the computing system 210 provides the initial transcription 285 and the alternates lists to the client device 216. During stage (H), the client device 216 displays a user interface 290 to the user 218 showing the initial transcription 285, e.g., "Mary had a little yam." At first, the alternates are not shown. The user 218, noticing an error in the last word, taps the word "yam." In response, the client device 216 displays the alternates list 280 corresponding to that word. The user 218 may select any of the items in that list to cause the word "yam" to be replaced by the selected alternate.

In some implementations, because alternates lists are determined for each word in the initial transcription 285, if the user 218 determines that another word or phrase from the initial transcription 285 should be changed, the user 218 may select that word or phrase to cause the corresponding set of alternates to be displayed. When an alternates list is displayed, the alternates may be displayed according to the ranking determined based on the classifier outputs 262.

In general, a discriminative model can be trained on the particular use case of choosing which alternates or spans to show. These techniques can be used to reduce the average number of alternates shown to the user without significantly reducing the number of errors that a user can correct. This is compared to a baseline where we simply choose up to M alternates to be shown, ordered based on the n-best list. Furthermore, the rank order in which alternates are displayed to the user can be determined based on the score from the classifier.

Other techniques can also be used to improve alternates shown to users. As an example, word alternates can be selected from deeper N-best lists of hypotheses, and from large lists of identified alternates. The alternates that are ultimately designated to be shown to users can be selected from a list of 10, 20, 50, etc., options, rather than from smaller lists.

As another example, sources of knowledge other than the speech recognizer, such as autocompletion systems, can be used to provide candidate words or phrases as potential alternates. For example, when generating alternates for the recognized phrase "mary had a little lamb", autocomplete suggestions can be requested for the phrase "mary had a little." The next word that is suggested can be evaluated as a potential alternate for the recognized word "lamb." In a similar manner, suggestions may also be identified for the phrases "mary," "mary had," and "mary had a," to identify potential alternates for other words of the initial transcription 285.

In some implementations, the trained classifier can be used to select word alternates in any of multiple different languages. Many of the features discussed above, such as rank in the N-best list, length of alternates, and length of original word to be replaced, are useful for multiple languages and are not dependent on the features of a particular language. The alternates classifier can be used with languages different from the language of training data used to train the classifier. In some instances, a single classifier may be trained and applied to multiple languages with good results, without requiring training data in each target language. Many of the features used may be indicative of an alternate's usefulness in a language-independent manner. For example, in some implementations, a classifier trained with only English language words and may provide useful scores for selecting alternates in other languages, such as Spanish, French, German, or Italian.

In some implementations, only N-best list position features are used to train the classifier and evaluate potential alternates. Because the N-best list position features are the result of processing by the speech recognizer system, they may implicitly include information that makes posterior probability features or other features unnecessary to achieve a high level of classification performance.

The techniques discussed herein provide a method for selecting word alternates from an N-best list for the purpose of speech recognition error correction. The method may employ a simple logistic regression model to estimate the probability that an alternate will offer a useful correction to the user. In some implementations, the average length of the alternates lists generated may be reduced without loss of the corrective power of the alternates. A logistic regression model trained on data from one language may be able to generalize to other languages with good results.

In some implementations, alternates lists may be populated from additional sources of information. Using a wide search beam during decoding may provide larger lattices from which to draw more N-best entries, at the cost of increased decoding time. Another method would be to employ dictionary access based on phonetic distance from a hypothesis word in order to recover homophones and near homophones which may not appear in the decoding lattice. Regardless of the methods used to generate additional alternates, reducing the number of unhelpful alternates drawn from the N-best list provides extra room for these additional alternates. In addition, a single classifier may be trained to select alternates from this pool of different sources.

Figure 5:
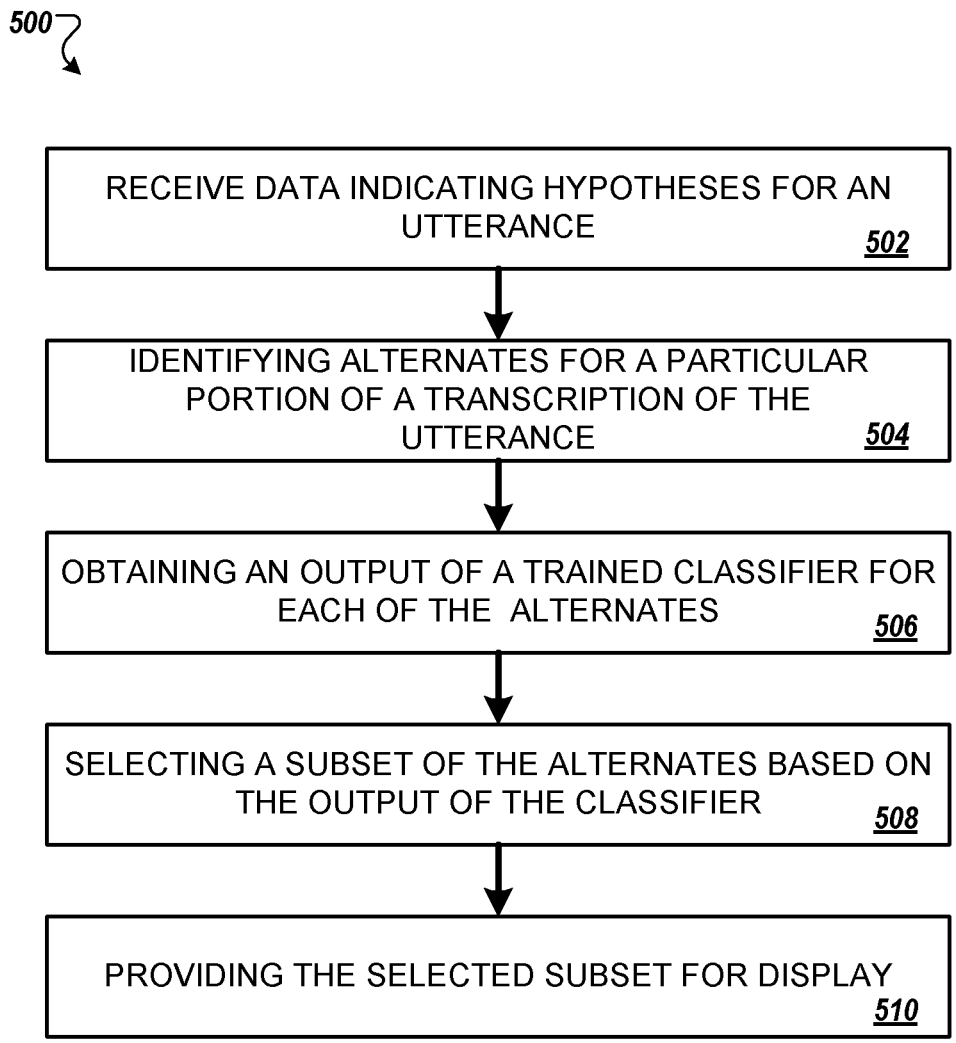
FIG. 5 is a flow diagram that illustrates an example of a process for selecting alternates in speech recognition.

FIG. 5 is a flow diagram that illustrates an example of a process 500 for selecting alternates for speech recognition. The process 500 may be performed by one or more computers, such as the computing system 210.

Data is received that indicates multiple speech recognition hypotheses for an utterance (502). For example, a speech recognition lattice indicating different candidate transcriptions may be received. The multiple speech recognition hypotheses may be ranked. For example, the hypotheses may be received as an N-best list of the hypotheses determined by a speech recognition system.

Multiple alternates are identified for a particular portion of a transcription of the utterance (504). The particular portion may be a word or phrase of the transcription. Each alternate may be a candidate substitution for the particular portion. Each of the alternates can be a word or a phrase that is different from the particular portion of the transcription of the utterance.

In many instances, the particular portion is a proper subset of the overall transcription of the utterance. The multiple alternates may be extracted from the multiple speech recognition hypotheses. The multiple alternates may be selected as corresponding to a similar portion of the utterance, e.g., the speech recognition system indicates that each of the multiple alternates is a candidate transcription for the same portion of the utterance as the particular portion of the transcription.

In some implementations, the particular portion of the transcription of the utterance corresponds to a particular word. To identify the multiple alternates, a time that the particular word begins or ends is determined with respect to the utterance. Data is accessed that indicates times that words in the multiple speech recognition hypotheses begin or end with respect to the utterance. Alternates are identified based on a measure indicative of a distance between (i) the time that the particular word begins or ends with respect to the utterance and (ii) the times that the words in the multiple speech recognition hypotheses begin or end with respect to the utterance.

An output or score is obtained from a trained classifier for each of the alternates (506). For example, for each of the identified alternates: (i) one or more feature scores are determined for the alternate; (ii) the one or more feature scores are input to the trained classifier; and (iii) an output is received from the classifier. The classifier can be a classifier that has been trained, using examples of selections of alternates made by users, to predict how likely an alternate is to be selected by a user. Thus, the trained classifier may have been trained to produce, based on input feature scores for an alternate, a score that indicates a likelihood that the alternate will be useful to a user.

Information may be extracted for each alternate. For example, feature scores can be determined for each of multiple features. Examples of features include: (i) the depth that an instance of the alternate occurs in the N-best list of hypotheses; (ii) the rank in the N-best list of the first hypothesis to include the alternate; (iii) the length of the string to be replaced; (iv) the length of the alternate string; (v) the relative lengths of the original string and alternate string; and (vi) binary features indicating whether the alternate occurs at individual positions in the n-best list.

Feature scores for various different features can be determined and input to the classifier. A feature score can be determined for each alternate that indicates whether the speech recognition hypothesis at a specific position in the ranking includes the alternate. A feature score can be determined for each alternate that indicates a number of unique identified alternates for the particular portion that occur in speech recognition hypotheses ranked higher than the highest-ranked speech recognition hypothesis that includes the alternate. A feature score can be determined for each alternate that indicates a ranking position of the highest-ranking speech recognition hypothesis that includes the alternate. A feature score can be determined for each alternate based on:

a length the particular portion of the transcription of the utterance; a length of the alternate; or a relative measure of (i) the length of the particular portion of the transcription of the utterance and (ii) the length of the alternate. A feature score can be determined for each alternate based on: a posterior probability for the alternate; a posterior probability for the particular portion of the transcription of the utterance; a language model score for the alternate; or a language model score for the particular portion of the transcription of the utterance. A feature score can be determined for each alternate based on: a text edit distance between the alternate and the particular portion of the transcription of the utterance; or a phone edit distance between alternate and the particular portion of the transcription of the utterance.

In some implementations, feature scores may be determined for features such as lattice posteriors, language model scores, and presence in autocomplete suggestions. Other examples of features include the text edit distance between an alternate and a recognized word, the phone edit distance between an alternate and a recognized word, and lexical access from lexicon. One or more of these features can be used in addition to or instead of the features discussed above.

Based on the classifier outputs, a subset of the identified alternates is selected (508). The subset can be a proper subset, including fewer than all of the identified alternates. The subset can include the alternates that have corresponding classifier outputs that satisfy a threshold. Alternates that have a corresponding classifier output that does not satisfy the threshold are excluded from the subset. The selected alternates can be designated as an alternates list for the particular portion. The classifier may be, for example, a maximum entropy or logistic regression classifier, an artificial neural network, a support vector machine, or another type of machine learning classifier.

Data indicating the selected subset of the alternates is provided for display (510). For example, the data indicating the alternates can be sent to a client device over a network, and for display at the client device in response to user input indicating a need to correct the particular portion of the transcription. The data can indicate a ranking or order of the alternates in the selected subset, where the ranking order is determined based on the classifier outputs for the alternates.

Figure 6:
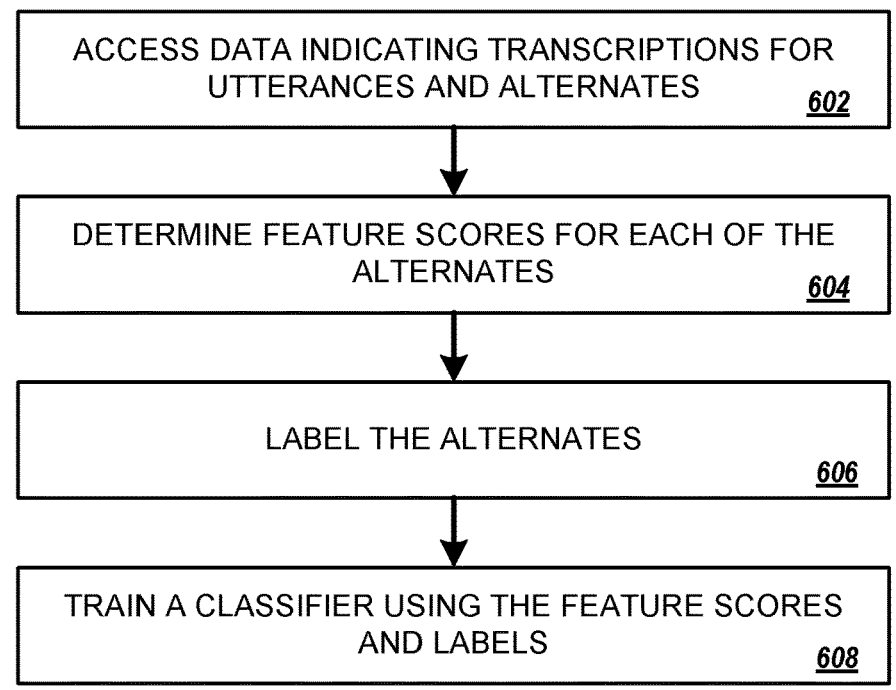
FIG. 6 is a flow diagram that illustrates an example of a process for training a classifier.

FIG. 6 is a flow diagram that illustrates an example of a process 600 for training a classifier. The process 600 may be performed by one or more computers, such as the computing system 210.

Data is accessed that indicates transcriptions for utterances and alternates for portions of the transcriptions (602). For example, a set of training data may include audio data for utterances and, in some implementations, information about the ground truth about the content of the utterances. The audio data may be processed with a speech recognition engine to determine a transcription, an N-best list of hypotheses, and alternates. Alternates can be selected from the N-best list of hypotheses in the same manner discussed above with respect to FIG. 2. To generate training data, feature scores for alternates from many different recognition attempts can be determined and labeled as discussed below.

The training data may be selected to include utterances with certain characteristics. For example, when an utterance is completely misrecognized, the user is more likely to re-speak the query than attempt to correct every single word using alternates. Therefore, training data may be limited to utterances which possess a small number of errors, for example, 1 to 3 word errors per utterance, to train the classifier for the most common use cases.

Feature scores are determined for each of the alternates (604). A set of feature scores can be determined for each alternate. A variety of different feature scores can be determined. Examples of features can include N-best list position features, posterior features, and text-distance-based features, as well as the rest of the features discussed above. The same types of feature scores generated for use during training are used also when using the trained classifier, as discussed in FIG. 2.

The alternates are labeled according to the usefulness in correcting the transcription (606). Each alternate receives a label. Each alternate that successfully corrects the corresponding word or words of a transcription may be labeled with a particular value, e.g., "1," and each alternate that does not represent a valid correction may be labeled with another value, e.g., "0." To facilitate labeling, the ground truth or actual content of each utterance in the training data set may be known. In some instances, user interactions may be used to obtain training data or labels. For example, if a user indicates that an error occurred in a transcription and selects a particular alternate as a correction, the selected alternate can be labeled as useful, while others that were not selected may be indicated to be not useful.

A classifier is trained using the feature scores and the labels (608). The classifier can be a maximum entropy classifier, an artificial neural network, a support vector machine, or other machine learning system. The classifier can be trained to determine whether an alternate is likely to be useful to a user or not. The classifier can be exposed to many examples of alternates, with the feature scores for the alternate at the input and the label used as a target output. As training proceeds, parameters of the model may be adjusted to reflect the patterns of examples provided to the classifier. Training can continue until the classifier, on average, predicts whether alternates will be useful or not to an acceptable degree.

A machine learning classifier is then trained with the labeled sets of feature scores, so that it can predict whether alternates are useful or not based on a set of input feature scores. A logistic regression classifier may be used. Other types of classifiers may additionally or alternatively be used. After training, when a new set of feature scores is input to the classifier, the classifier will output a score indicating a likelihood that the proposed alternate corresponding to the feature scores will be useful to a user.

Figure 7:
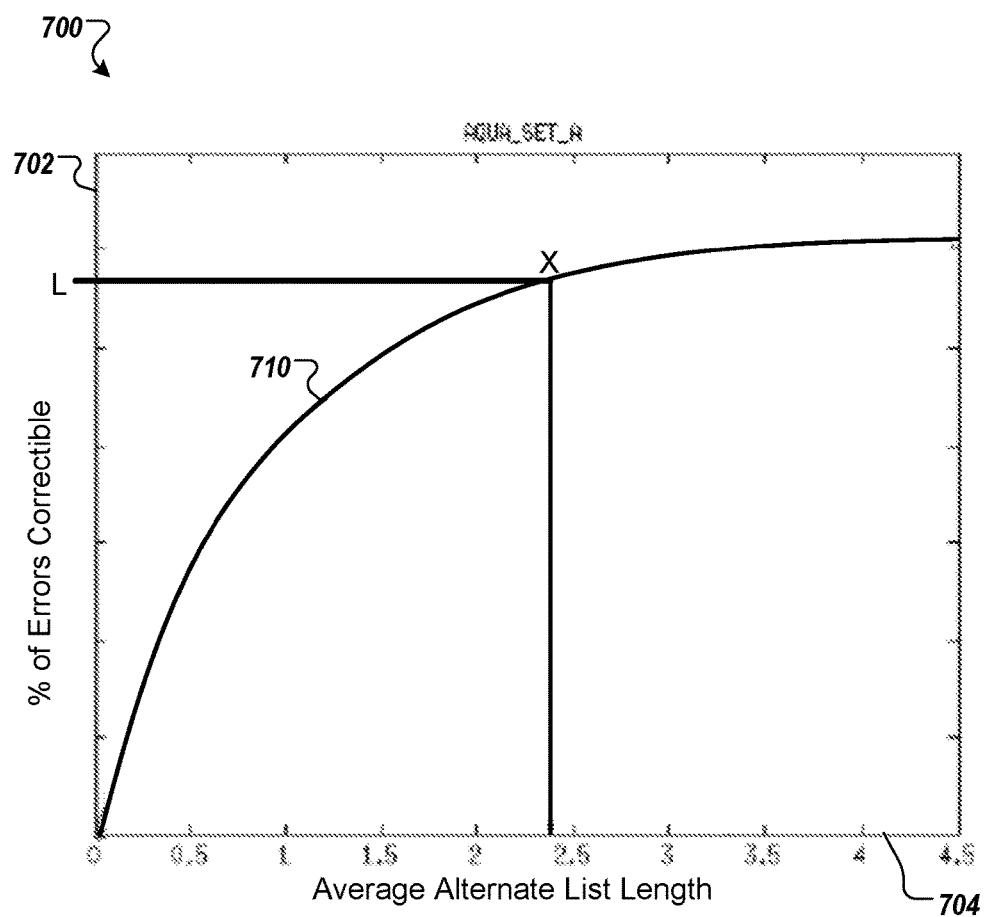
FIG. 7 is a diagram that illustrates an example of a chart of classifier characteristics.

FIG. 7 is a diagram that illustrates an example of a chart 700 of classifier characteristics. In some implementations, it may be useful to balance the fraction of word errors correctable using alternates, and the average length of each list of alternates. A system can trade between these quantities by adjusting the accept threshold imposed upon the estimate of the posterior probability that an alternate can correct an error. As this threshold is raised typically fewer alternates would be selected, reducing the expected alternate list length but also the chance that a useful alternate appears in the list.

In some implementations, a computing system can produce an operating curve 710, determined based on the characteristics of a trained classifier, that indicates the tradeoff between the number of errors that can be corrected and the average length of the alternate list. The curve 710 can be created by plotting points while moving a threshold across the score from the classifier applied to a development set of data. A vertical axis 702 indicates the percentage of errors that can be corrected, and a horizontal axis 704 indicates the average alternate list length. The curve 710 may thus indicate the percentage of errors correctable for various alternate list lengths.

The curve 710 may also be used to estimate what percentage of errors alternate lists of a given length are likely to be able to correct. The operating curve 710 can be used to determine how many alternates should be shown to users. A threshold associated with a particular operating point on the curve 710 can be selected. This operating point can be used as a parameter to tune the use of the classifier when recognizing user speech. In the example of FIG. 7, a threshold level, L, can be set, which corresponds to a particular percentage of errors, on average, that the alternate list should be able to correct. An operating point, X, on the curve 710 is selected that corresponds to the threshold level, L. In the example, the operating point, X, falls between the value of 2 and 3 on the horizontal axis 704. This suggests that alternate lists that include the 3 highest-ranked alternates, e.g., as ranked according to classifier outputs, generally provide the alternates needed to correct at least the percentage of errors indicated by the threshold level, L. Based on the position of the selected operating point, X, an alternate list length that provides acceptable error-correction potential may be selected.

The curve 710 shows that increasing the length of the alternates list shown to users may provide incremental improvements in how many errors the lists allow users to correct. However, longer lists require additional display space and may require more time and effort for users to review. In addition, the curve 710 indicates that, at least in some instances, the amount of additional errors that longer lists are able to correct can be small. Operating curves may show, for example, that lists of 5 alternates may not provide a significant increase in corrections over lists of 3 alternates. In some instances, a significantly shorter list of alternates may be able to correct most of the errors correctable by a longer list, and so providing lists of the shorter length may be preferred.

Figure 8:
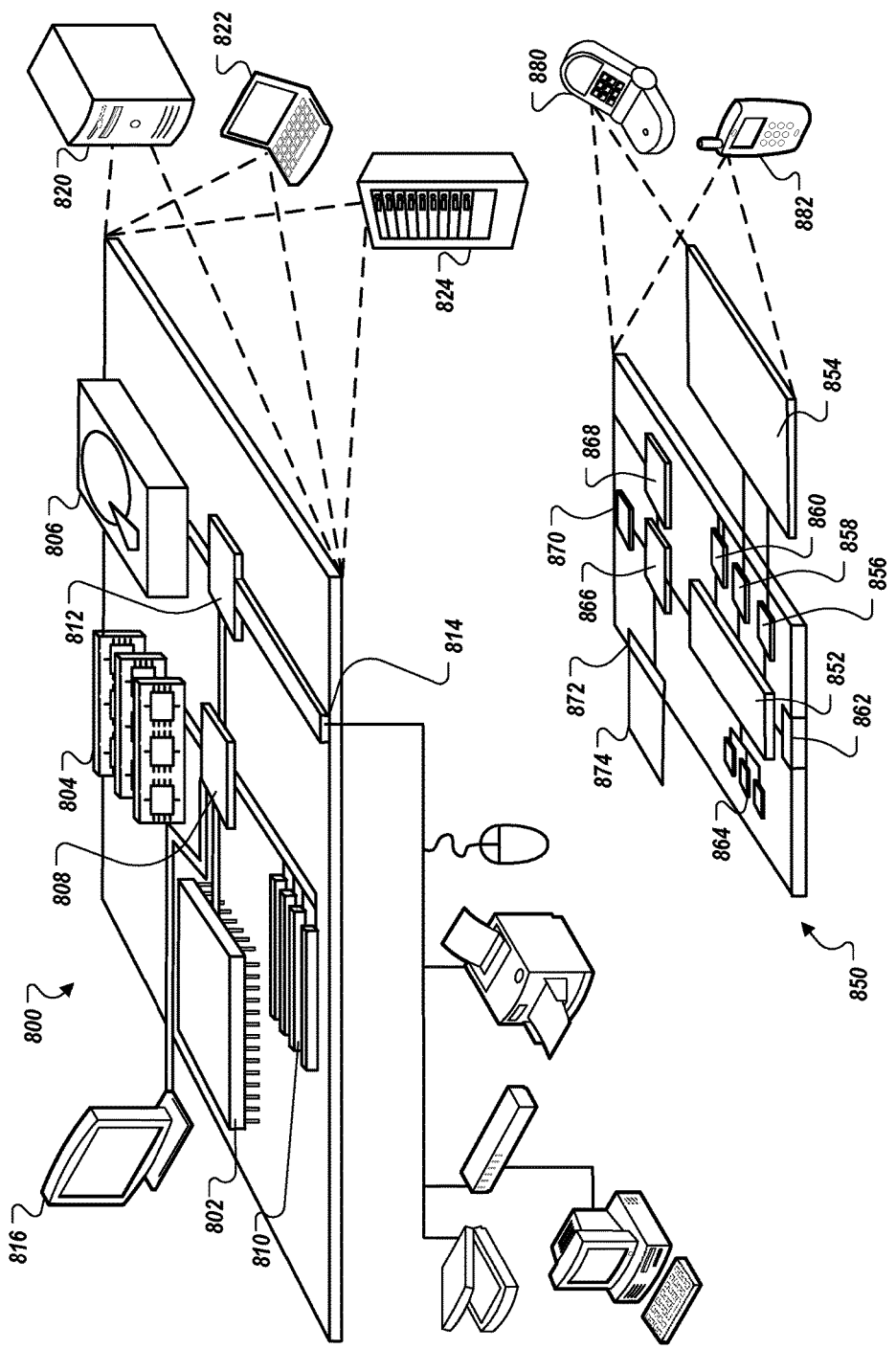
FIG. 8 is a schematic diagram that shows an example of a computing device and a mobile computing device.

FIG. 8 shows an example of a computing device 800 and an example of a mobile computing device 850 that can be used to implement the techniques described above. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, Wi-Fi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, tablet computer, wearable computer, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   obtaining, by one or more computers, acoustic data for an utterance;
   determining, by the one or more computers, speech recognition candidates for the utterance based on the acoustic data;
   obtaining, by the one or more computers, a ranking of the speech recognition candidates determined by a speech recognizer;
   selecting, by the one or more computers, a transcription for the acoustic data from among the speech recognition candidates;
   determining, by the one or more computers, feature scores from the ranking of the speech recognition candidates;
   generating, by the one or more computers, a classifier output for each of at least some of the speech recognition candidates, wherein each of the classifier outputs is an output that a trained machine learning classifier provided in response to receiving at least one of the feature scores as input;
   selecting, by the one or more computers, a subset of the speech recognition candidates based on the classifier outputs of the trained machine learning classifier; and
   providing, by the one or more computers and for display at a client device, data indicating (i) the transcription for the utterance and (ii) the subset of the speech recognition candidates as a set of alternative transcriptions for the utterance, wherein the one or more computers are configured to provide different quantities of alternative transcriptions for different utterances.

2. The method of claim 1, comprising:
   determining, by the one or more computers, a second ranking of the speech recognition candidates in the subset of the speech recognition candidates, the second ranking being based on the scores generated from the outputs of the trained machine learning classifier;
   determining, by the one or more computers, a quantity of alternative transcriptions for the utterance to provide for display, the quantity of alternative transcriptions being fewer than all of the speech recognition candidates for the utterance;
   wherein providing the subset of speech recognition candidates comprises (i) providing a subset of the speech recognition candidates having the determined quantity of speech recognition candidates and (ii) providing data indicating the second ranking of the speech recognition candidates in the subset of the speech recognition candidates.

3. The method of claim 2, wherein the utterance is a first utterance; and
   wherein the method comprises, after providing the transcription and the subset of speech recognition candidates for the utterance, providing a transcription for a second utterance and a set of alternative transcriptions for the second utterance, wherein the set of alternative transcriptions for the second utterance is different from the quantity determined for the first utterance, and wherein the quantity of alternative transcriptions for the second utterance is less than a quantity of speech recognition candidates determined for the second utterance.

4. The method of claim 1, wherein at least one of the alternative transcriptions includes a different number of words than the transcription.

5. The method of claim 1, wherein the transcription includes only a single word, and the alternative transcriptions include at least a first alternative transcription that includes only a single word and a second alternative transcription that includes multiple words.

6. The method of claim 1, wherein the transcription includes multiple words, and the alternative transcriptions include at least a first alternative transcription that includes only a single word and a second alternative transcription that includes multiple words.

7. The method of claim 1, wherein the transcription comprises a plurality of words; and
   wherein the method includes providing, by the one or more computers, a different set of alternative transcriptions for each of multiple words in the plurality of words, wherein the different sets of alternative transcriptions include different quantities of alternative transcriptions.

8. The method of claim 1, wherein generating the classifier output for each of at least some of the speech recognition candidates comprises providing, as input to the trained machine learning classifier, a value indicating a text edit distance between the alternate and a particular word of the transcription of the utterance.

9. The method of claim 1, wherein obtaining the acoustic data comprises receiving the acoustic data from a client device over a communication network; and
   wherein providing the data indicating the transcription and the subset of the speech recognition candidates comprises providing the transcription and the subset of the speech recognition candidates to the client device over the communication network.

10. A system comprising:
one or more computers; and
one or more storage devices storing instructions that, when executed by the one or more computers, cause the one or more computers to perform operations comprising:
- obtaining, by the one or more computers, acoustic data for an utterance;
- determining, by the one or more computers, speech recognition candidates for the utterance based on the acoustic data;
- obtaining, by the one or more computers, a ranking of the speech recognition candidates determined by a speech recognizer;
- selecting, by the one or more computers, a transcription for the acoustic data from among the speech recognition candidates;
- determining, by the one or more computers, feature scores from the ranking of the speech recognition candidates;
- generating, by the one or more computers, a classifier output for each of at least some of the speech recognition candidates, wherein each of the classifier outputs is an output that a trained machine learning classifier provided in response to receiving at least one of the feature scores as input;
- selecting, by the one or more computers, a subset of the speech recognition candidates based on the classifier outputs of the trained machine learning classifier; and
- providing, by the one or more computers and for display at a client device, data indicating (i) the transcription for the utterance and (ii) the subset of the speech recognition candidates as a set of alternative transcriptions for the utterance, wherein the one or more computers are configured to provide different quantities of alternative transcriptions for different utterances.

11. The system of claim 10, wherein the operations comprise determining, by the one or more computers, a quantity of alternative transcriptions for the utterance to provide for display, the quantity of alternative transcriptions being fewer than all of the speech recognition candidates for the utterance; and
- wherein providing the subset of speech recognition candidates comprises providing a subset of the speech recognition candidates having the determined quantity of speech recognition candidates.

12. The system of claim 11, wherein the utterance is a first utterance; and
- wherein the operations comprise, after providing the transcription and the subset of speech recognition candidates for the utterance, providing a transcription for a second utterance and a set of alternative transcriptions for the second utterance, wherein the set of alternative transcriptions for the second utterance is different from the quantity determined for the first utterance, and wherein the quantity of alternative transcriptions for the second utterance is less than a quantity of speech recognition candidates determined for the second utterance.

13. The system of claim 10, wherein at least one of the alternative transcriptions includes a different number of words than the transcription.

14. The system of claim 10, wherein the transcription includes only a single word, and the alternative transcriptions include at least a first alternative transcription that includes only a single word and a second alternative transcription that includes multiple words.

15. One or more non-transitory computer-readable media storing instructions that, when executed by one or more computers, cause the one or more computers to perform operations comprising:
- obtaining, by the one or more computers, acoustic data for an utterance;
- determining, by the one or more computers, speech recognition candidates for the utterance based on the acoustic data;
- obtaining, by the one or more computers, a ranking of the speech recognition candidates determined by a speech recognizer;
- selecting, by the one or more computers, a transcription for the acoustic data from among the speech recognition candidates;
- determining, by the one or more computers, feature scores from the ranking of the speech recognition candidates;
- generating, by the one or more computers, a classifier output for each of at least some of the speech recognition candidates, wherein each of the classifier outputs is an output that a trained machine learning classifier provided in response to receiving at least one of the feature scores as input;
- selecting, by the one or more computers, a subset of the speech recognition candidates based on the classifier outputs of the trained machine learning classifier; and
- providing, by the one or more computers and for display at a client device, data indicating (i) the transcription for the utterance and (ii) the subset of the speech recognition candidates as a set of alternative transcriptions for the utterance, wherein the one or more computers are configured to provide different quantities of alternative transcriptions for different utterances.

16. The one or more non-transitory computer-readable media of claim 15, wherein the operations comprise determining, by the one or more computers, a quantity of alternative transcriptions for the utterance to provide for display, the quantity of alternative transcriptions being fewer than all of the speech recognition candidates for the utterance;
- wherein providing the subset of speech recognition candidates comprises providing a subset of the speech recognition candidates having the determined quantity of speech recognition candidates.

17. The method of claim 1, wherein generating the score for each of at least some of the speech recognition candidates comprises providing, as input to the trained machine learning classifier, a value indicating a phone edit distance between alternate and a particular word of the transcription of the utterance.

18. The method of claim 1, further comprising:
- obtaining data indicating a set of autocomplete suggestions; and
- determining whether a particular speech recognition candidate is included in the set of autocomplete suggestions;
- wherein generating the score for each of at least some of the speech recognition candidates comprises providing, as input to the trained machine learning classifier, a value indicating whether the particular speech recognition candidate is included in the set of autocomplete suggestions.

19. The method of claim 1, wherein the machine learning classifier comprises a maximum entropy or logistic regression classifier, an artificial neural network, or a support vector machine.

20. The method of claim 1, wherein selecting the subset of the speech recognition candidates based on the scores generated from the outputs of the trained machine learning classifier comprises:
 selecting a subset of the speech recognition candidates in which (i) the scores for the selected speech recognition candidates each satisfy a threshold, and (ii) a total number of speech recognition candidates in the subset is less than a maximum threshold.

* * * * *